United States Patent
Arques et al.

(10) Patent No.: US 7,057,179 B2
(45) Date of Patent: Jun. 6, 2006

(54) PARTICLE DETECTOR AND A COUNTING DEVICE COMPRISING A NUMBER OF PARTICLE DETECTORS

(75) Inventors: Marc Arques, Grenoble (FR); Anthony Bardet, Grenoble (FR)

(73) Assignee: Commissariat A L'Energie Atomique, Paris (FR)

( * ) Notice: Subject to any disclaimer, the term of this patent is extended or adjusted under 35 U.S.C. 154(b) by 316 days.

(21) Appl. No.: 10/716,692

(22) Filed: Nov. 19, 2003

(65) Prior Publication Data

US 2004/0144926 A1 Jul. 29, 2004

(30) Foreign Application Priority Data

Nov. 26, 2002 (FR) .................................. 02 14811

(51) Int. Cl.
*G01T 1/24* (2006.01)

(52) U.S. Cl. ............................ 250/370.01; 250/370.11; 250/370.14; 250/370.09

(58) Field of Classification Search ........... 250/370.01, 250/370.11, 370.14, 371, 370.08, 370.09, 250/370.06

See application file for complete search history.

(56) References Cited

U.S. PATENT DOCUMENTS

| | | | | |
|---|---|---|---|---|
| 5,066,861 A | * | 11/1991 | Nakayama et al. | 250/370.09 |
| 5,107,122 A | * | 4/1992 | Barkan et al. | 250/370.01 |
| 6,420,712 B1 | * | 7/2002 | Menlove et al. | 250/390.01 |
| 6,424,750 B1 | | 7/2002 | Colbeth et al. | |
| 2004/0141587 A1 | * | 7/2004 | Arques et al. | 378/98.8 |

FOREIGN PATENT DOCUMENTS

EP 1 102 323 A1 5/2001

OTHER PUBLICATIONS

Patent Abstracts of Japan, Tomizaki Takayuki, "Image-Pickup Device", Publication No. 10285466, Publication Date Oct. 23, 1998, 1 page.

* cited by examiner

*Primary Examiner*—Otilia Gabor
*Assistant Examiner*—Christine Sung
(74) *Attorney, Agent, or Firm*—Pearne & Gordon LLP

(57) ABSTRACT

This invention relates to a particle detector comprising means (1, 2, 3) of delivering electrical pulses and means (4) of counting delivered electrical pulses.

The detector comprises means capable of receiving and transmitting electrical pulses originating from at least one second particle detector to the counting means (4) and means capable of transmitting electrical pulses that it delivers and electrical pulses that it receives from the said second particle detector to the counting means of a third particle detector.

The invention is particularly applicable to radiology (X-ray, radioscopy).

13 Claims, 6 Drawing Sheets

PARTICLE DETECTOR AND A COUNTING DEVICE COMPRISING A NUMBER OF PARTICLE DETECTORS

TECHNICAL DOMAIN AND PRIOR ART

This invention relates to a particle detector comprising counting means to provide counting information about a number of detected particles and a particle counting device comprising several particle detectors.

The invention also relates to a process for reading a particle detector and a process for reading a matrix of particle detectors.

Some applications of the invention are in the radiology field (radiography, radioscopy).

The detected particles are then X-rays.

According to known art, devices for the formation of images used in radiology are composed of detector matrices. Each detector, more commonly known as a "detector pixel", delivers a signal that is a function of the quantity of particles that it detects.

Radiography is a high resolution spatial examination on a single image made on the basis of a medium or strong irradiation dose. In order to achieve a high spatial resolution, the detector must have small detector pixels (typically from 50 μm to 150 μm).

Radioscopy is a video speed examination that can last from several seconds to several minutes. The irradiation dose per image is then much lower so that the total dose accumulated by a patient is acceptable. A noisy image is then obtained since the statistics for the number of photons detected by the detector pixel are poor. It is then illusory to want to detect objects the size of pixels.

Therefore, the operating modes of radiography and radioscopy are very significantly different. However, it is known that these two different operating modes can be implemented using detector matrices operating by integration of detection currents in storage capacities.

For example, in the case of radioscopy, detector pixels are usually grouped in sets of four (2×2) or sixteen (4×4) before being read. Thus, the output rate is reduced without any loss of spatial resolution. This also provides a means of reducing read noise. Groups of detector pixels are formed by mixing storage capacity information for the pixels concerned, before reading, by turning on the switches connecting them together. All that is then necessary to obtain the average of the detected information is to read any one of the detector pixels in the group.

This solution has several disadvantages. Firstly, when a detector is defective, the response of the entire group of detectors to which the defective detector belongs is unusable. Furthermore, operation by integration is not a good way of reducing noise. To reduce read noise, it is better to work in counting since signals can then be digitized as soon as they are output from detectors.

The invention does not have the disadvantages mentioned above.

PRESENTATION OF THE INVENTION

The invention relates to a particle detector comprising means of delivering electrical pulses starting from detected particles, a delivered electrical pulse corresponding to one detected particle, and means of counting the delivered electrical pulses. The detector comprises means capable of receiving and transmitting electrical pulses originating from at least one second particle detector to the counting means, and means capable of transmitting the electrical pulses that it delivers and electrical pulses that it receives from the said second particle detector to counting means of a third particle detector.

According to another characteristic of the particle detector, the means capable of receiving and transmitting electrical pulses originating from at least one second particle detector to the counting means and the means capable of transmitting electrical pulses that it delivers and electrical pulses that it receives from the second particle detector to the counting means of a third particle detector include an "OR" gate with a first input to which electrical pulses delivered by the particle detector are applied, at least one additional input to which electrical pulses delivered by the second particle detector are applied, and an output connected firstly to an input of the counting means and secondly to an input of an "OR" gate of the counting means of the third particle detector.

According to another characteristic, the particle detector comprises a monostable device placed between the output from the means of delivering electrical pulses from the detected particles and the first input.

According to another characteristic, the particle detector is such that the means capable of receiving and transmitting electrical pulses originating from at least one second particle detector to the counting means and the means capable of transmitting electrical pulses that it delivers and electrical pulses that it receives from the said second particle detector to the counting means of a third particle detector include a switch installed in series on the additional input.

According to yet another characteristic, the particle detector comprises means of inhibiting operation of the counting means.

The invention also relates to a particle counting device comprising several particle detectors according to the invention.

According to another characteristic, the particle detectors in the counting device are arranged in the form of a matrix of detectors.

According to yet another characteristic, the counting device includes means of arranging particle detectors in the form of N blocks of n×m neighboring particle detectors, where N, n, and m are integer numbers equal to or greater than 1, such that at least one block of particle detectors includes a particle detector that counts particles detected by all or some of the particle detectors in the block.

According to yet another characteristic, the counting device includes means of modifying the number n×m of particle detectors that participate in at least one block of particle detectors.

According to yet another characteristic, a particle detector Di/j located at the intersection of a row of rank i or a column of rank j, comprises an "OR" gate with three inputs, a first additional input being connected to a first switch and a second additional input being connected to a second switch, the first and second switches in the particle detector Di/j being connected to the output from the "OR" gate of particle detector D(i−1)/j and to the output from the "OR" gate of particle detector Di/(j−1), respectively, the output from the "OR" gate of detector Di/j being connected to the first switch of the particle detector D(i+1)/j and to the second switch of the particle detector Di/(j+1).

The invention also relates to a process for reading particle detectors. The process comprises a step during which at least one first particle detector receives and counts pulses delivered by at least one second particle detector and a step during which the pulses delivered by the first particle detector and the pulses delivered to the first particle detector by the second particle detector are transmitted to counting means in a third particle detector.

The invention also relates to a process for counting particles detected by a matrix of particle detectors. The process comprises a control step to arrange particle detectors in the matrix in the form of N blocks of n×m neighboring particle detectors, where N, n and m are integers greater than or equal to 1, the particle detectors in at least one block being read by means of a process for reading a detector according to the invention such that a particle detector in the said at least one block counts particles detected by all or some of the n×m particle detectors in the said block.

According to another characteristic, the counting process comprises inhibition of the counting means in particle detectors in the block, other than the particle detector in the block that counts particles detected by all or some of the m×n particle detectors.

BRIEF DESCRIPTION OF THE FIGURES

Other characteristics and advantages of the invention will become clear after reading a preferred embodiment of the invention with reference to the attached figures among which.

The same marks denote the same elements in all figures.

DETAILED DESCRIPTION OF EMBODIMENTS OF THE INVENTION

Figure 1:
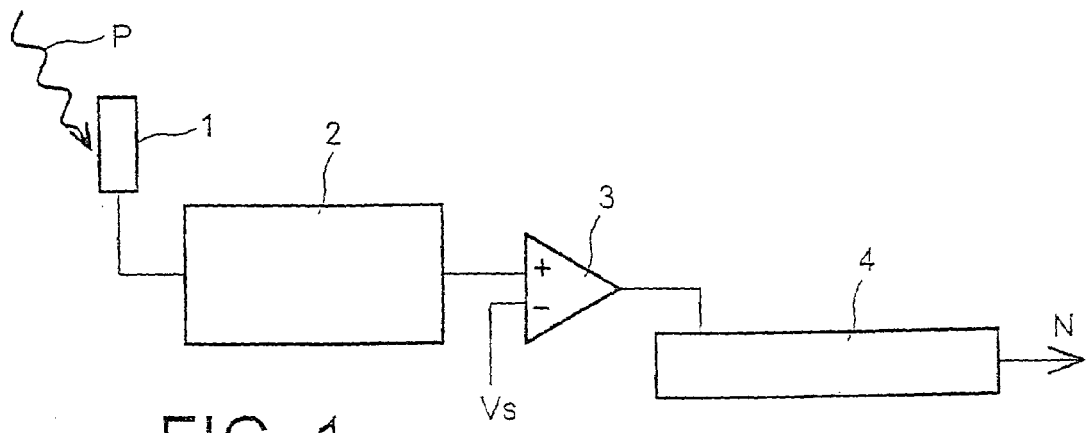
FIG. 1 shows a particle detector including counting means for delivering counting information about a number of particles detected according to known art.

FIG. 1 shows a particle detector according to known art comprising counting means for delivering counting information about a number of detected particles.

The particle detector comprises a semiconductor element 1, a processing circuit 2, a comparator 3 and a counter 4. The semiconductor element 1 comprises one or several detection layers that absorb particles P, for example X-rays, and transform them into electrical pulses. The processing circuit 2 processes electrical pulses (amplification, filtering, etc.), and the comparator 3 compares each electrical pulse delivered from the processing circuit 2 with a threshold voltage Vs. The comparator 3 thus delivers a digital electrical pulse starting from the electrical pulse delivered from the processing circuit 2. The digital electrical pulses increment the counter 4. At the end of irradiation, the counter 4 contains information representative of the number N of detected particles.

Figure 2:
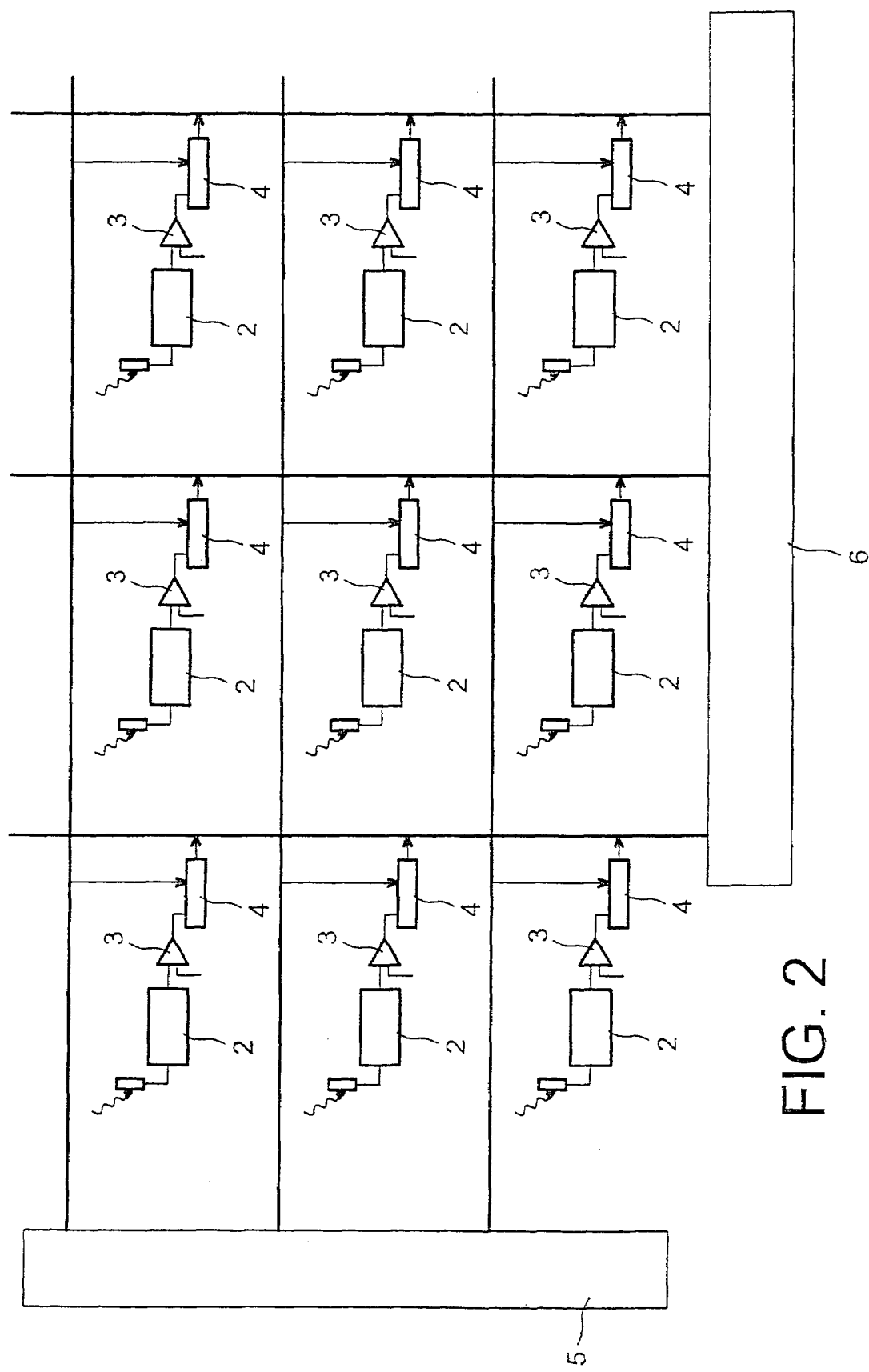
FIG. 2 shows a particle counting device comprising several particle detectors according to known art.

FIG. 2 shows a particle counting device comprising several particle detectors according to known art. The counting device is arranged in the form of rows and columns of detectors. A row addressing offset register 5 controls reading of the counters 4, row by row. Counting information output by a counter 4 is transmitted to a column multiplexer 6, column by column.

Figure 3:
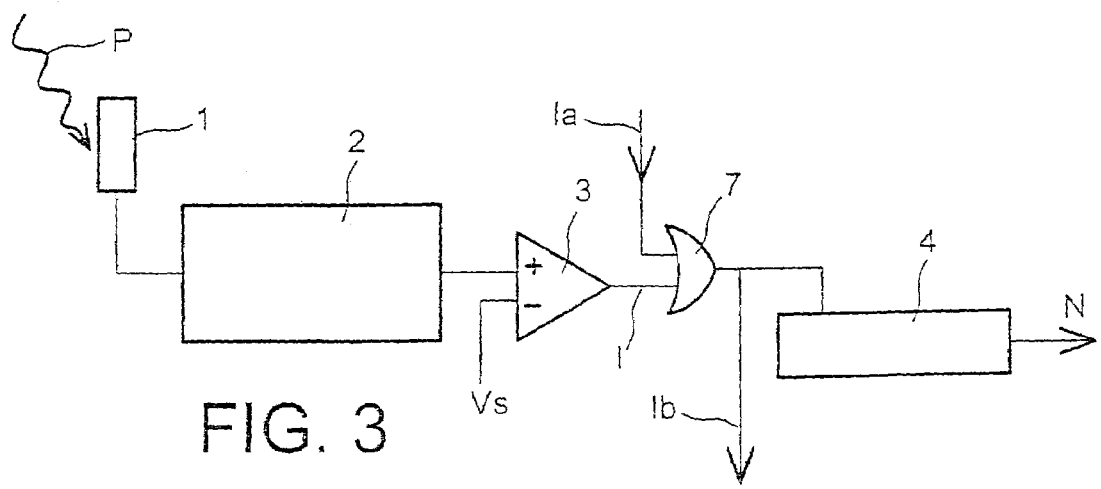
FIG. 3 shows a first example of a particle detector comprising counting means according to the invention.

FIG. 3 shows a first example of a particle detector comprising counting means according to the invention. In addition to the elements mentioned above, the particle detector according to the invention comprises an "OR" gate 7 placed between the comparator 3 and the counter 4. The "OR" gate has a first input connected to the output from the comparator 3 and a second input connected to the output from an "OR" gate of a first neighboring detector (not shown in the figure). The output from the "OR" gate is connected firstly to the counter 4 and secondly to an input of an "OR" gate of a second neighboring detector (also not shown in the figure).

The "OR" gate 7 performs the "OR" function between the digital pulse I delivered by the comparator 3 and a digital pulse Ia delivered by the comparator of the first neighboring detector. The digital pulse Ib (Ib=I or Ia) delivered from the "OR" gate 7 is transmitted to the input of the "OR" gate of the second neighboring detector. In general, each detector performs the "OR" function between the pulses that it detects and pulses from a neighboring detector. Therefore each detector can count its own events and events that it imports.

Figure 4:
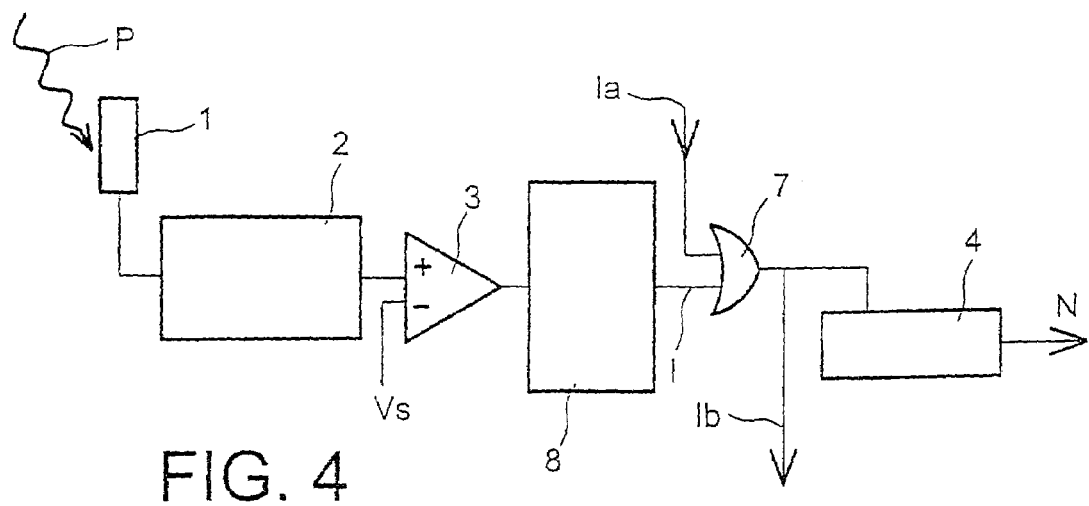
FIG. 4 shows a first improvement to the particle detector according to the invention.

If the duration of the electrical pulse delivered by the semi-conductor element 1 is very short, for example 10 ns, it is possible that the processing device 2 very significantly extends this duration, for example to increase it to 100 ns. The comparator can then changeover to 1 at any time during this period. The "OR" gate is then insensitive to information imported from the neighboring detector throughout this period. FIG. 4 shows an improvement to the circuit in FIG. 3 to reduce the duration of the pulse delivered from the comparator 3. A monostable device 8 is then inserted between the output from comparator 3 and the input to the "OR" gate 7. The monostable device 8 is triggered on rising fronts of the comparator output and automatically returns to zero after a predetermined time, for example 5 ns. Pulses processed by the "OR" gate are then short and advantageously enable a high counting rate.

In the remainder of the description, the monostable device 8 is not shown in the figures, in order to avoid making the drawings unclear. However, a particle detector according to the invention preferably includes such a device.

Figure 5:
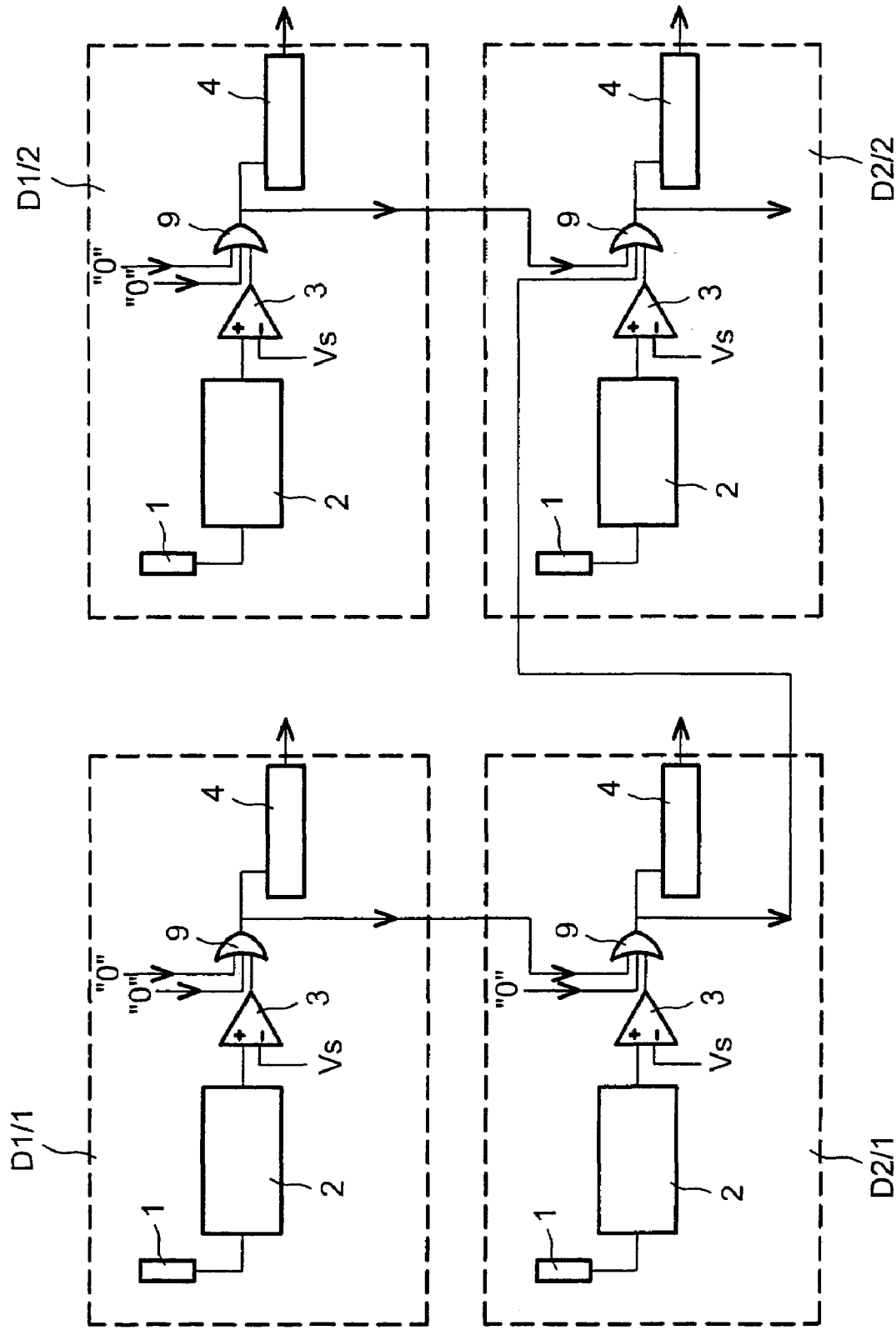
FIG. 5 shows a first example of the counting device comprising several particle detectors according to the invention.

FIG. 5 shows a first example of a counting device including several particle detectors according to the invention.

The counting device shown as an example in FIG. 5 comprises a group of four particle detectors D1/1, D1/2, D2/1, D2/2 arranged in two rows and two columns. Detectors Di/j (i=1, 2; j=1, 2) are identified by their row i and column j indexes.

The output from the "OR" gate of detector D1/1 is connected to an input to the "OR" gate of detector D2/1 and the output from the "OR" gate of detector D1/2 is connected to an input of the "OR" gate of detector D2/2. Furthermore, the output from the "OR" gate of detector D2/1 is connected to an input to the "OR" gate of detector D2/2. Consequently:
- the counter of detector D1/1 counts particles detected by detector D1/1;
- the counter of detector D2/1 counts particles detected by detectors D2/1 and D1/1;
- the counter of detector D1/2 counts particles detected by detector D1/2; and
- the counter of detector D2/2 counts particles detected by the four detectors D1/1, D1/2, D2/1 and D2/2.

In the embodiment shown in FIG. 5, the "OR" gates 9 of detectors D1/1, D1/2, D2/1 and D2/2 comprise three inputs to collect detected pulses. If the "OR" gate of detector D2/2 has to comprise three inputs to collect the different pulses detected, it is obvious that two inputs are sufficient for the "OR" gate of detector D2/1 and that a single input is sufficient for the "OR" gates of detectors D1/1 and D1/2. The "OR" gates of all detectors comprise three inputs for reasons of convenience (manufacturing of identical circuits). "Unnecessary" inputs to the "OR" gates of detectors D1/1, D1/2 and D2/1 are then permanently held at "0" (for positive logic). Groups of four detectors like those shown in FIG. 5 can be collected together to form a detectors matrix. The resulting counting device can then be applied, for example, to radioscopy.

Figure 6:
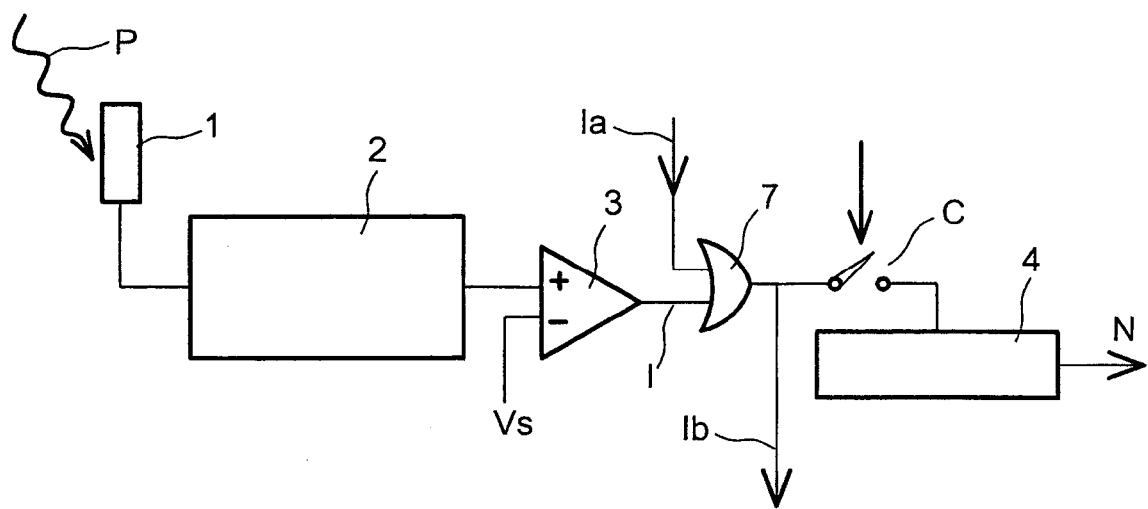
FIG. 6 shows a second improvement to the particle detector according to the invention.

When detectors are operated in groups, it is obvious that not all counters need to operate since the information output by them is not used. It may then be advantageous to completely inhibit the counters, for example to reduce consumption. Consequently, each detector can then comprise means of inhibiting the counter contained in it. FIG. 6 shows an example of a detector equipped with means of inhibiting the counter. Means of inhibiting the counter 4 are composed of a switch C controlled to open when the counter is to be inhibited, and to close when the counter is to be active.

Figure 7:
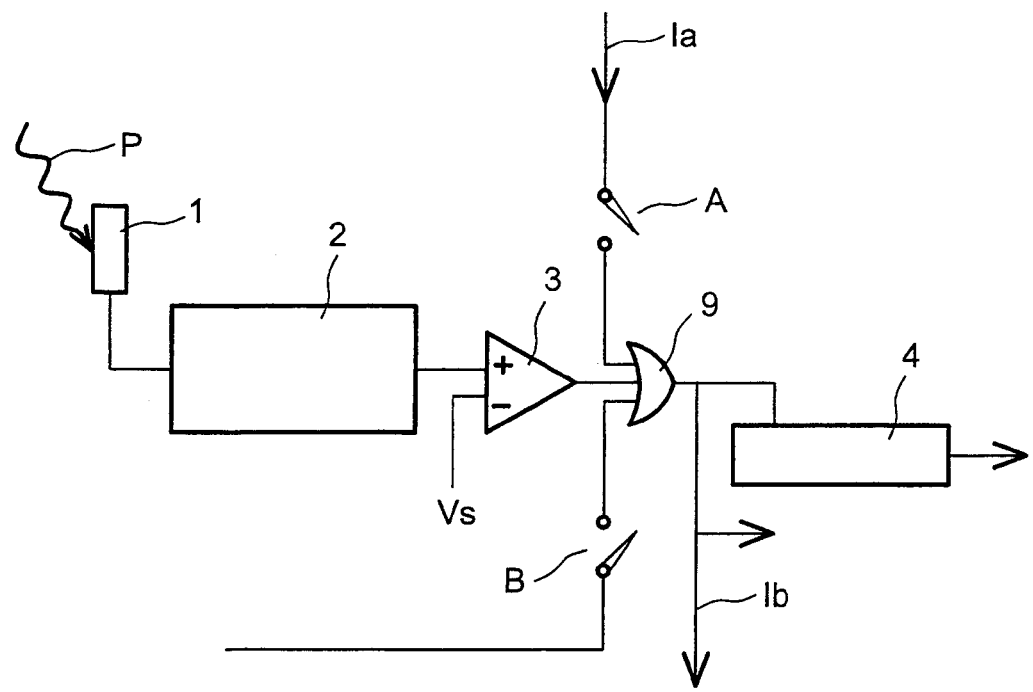
FIG. 7 shows a second example of a particle detector comprising counting means according to the invention.

According to one improvement of the invention, the particle detector comprises means of modifying the number of detectors that participate in a group of detectors. FIG. 7 shows an example of a particle detector incorporating such an improvement.

A first input to the "OR" gate 9 with three inputs is connected to a first switch A and a second input to the "OR" gate 9 is connected to a second switch B. Depending on the control state of switches A and B, it will for example then be possible that a single particle detector can be used individually (radiography mode), in a group of 2×2 detectors (first example of radioscopy mode) or in a group of 4×4 detectors (second example of radioscopy mode), and other groups of detectors are also possible. However, note that opening a switch A or B is not sufficient to satisfactorily control the input state of the "OR" gate 9. For the reasons mentioned above, the input to the "OR" gate 9 that is connected to a switch in the open position then has to be set to logical level "0" (for positive logic) to enable correct operation of the detector.

Figure 8:
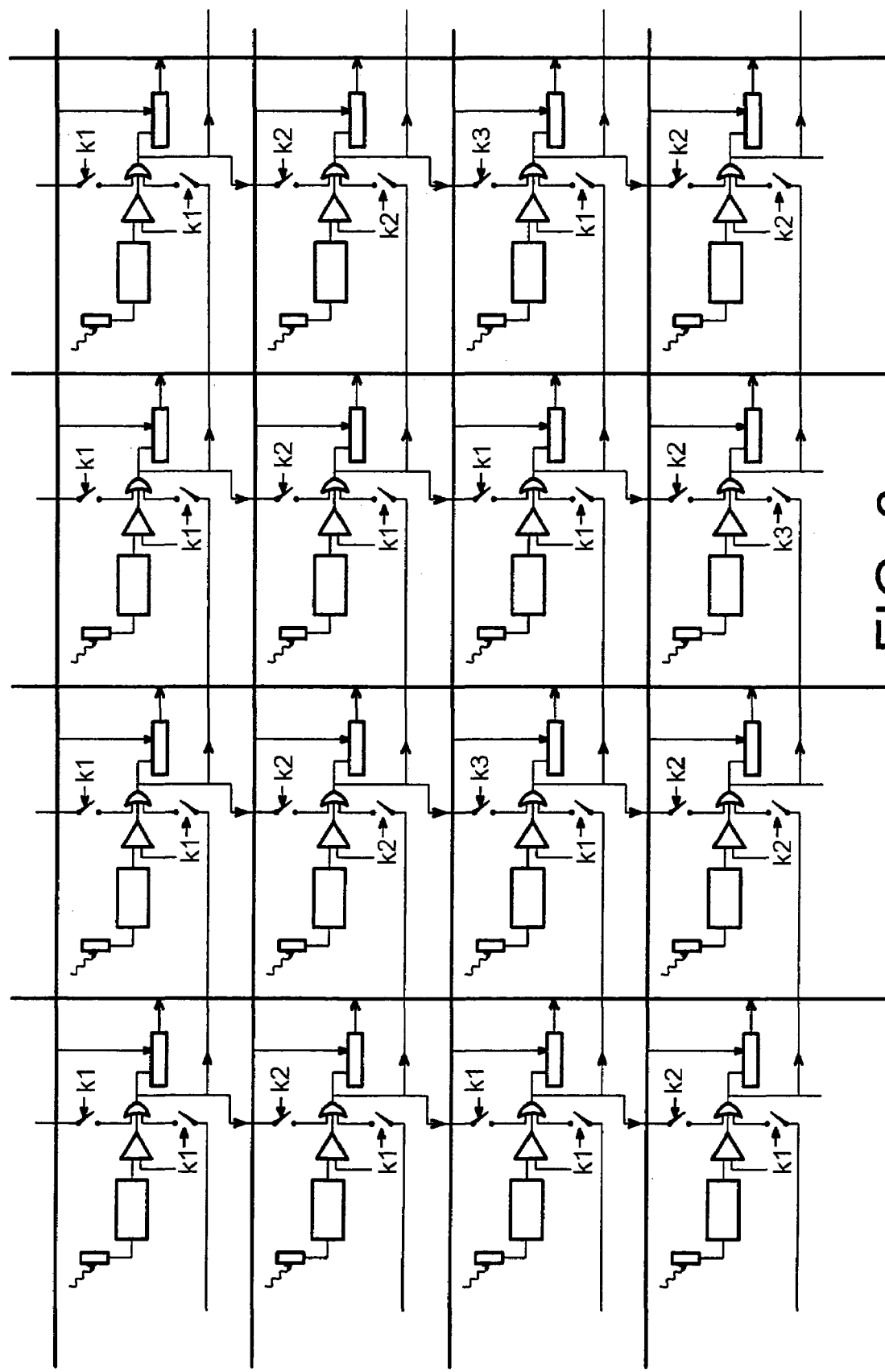
FIG. 8 shows an example counting device comprising several particle detectors according to the second example of the invention.

FIG. 8 shows an example of a counting device according to the invention composed of a matrix of sixteen (4×4) detectors like the detectors shown in FIG. 7. For reasons of convenience, the circuits that can set the inputs of the "OR" gates to logical level "0" (case of positive logic) when switches A and B are in the open position are not shown in the Figure.

The first and second switches A and B of a detector Di/j are connected to the output from the "OR" gate of detector D(i−1)/j and to the output of the "OR" gate of detector Di/(j−1), respectively. Moreover, the output from the "OR" gate of the detector Di/j is connected to the first switch A of detector D(i+1)/j and to the second switch B of detector Di/(j+1).

Depending on the state (conducting or blocked) of switches A and B of detector Di/j, this detector can then collect the output signal from the "OR" gate of detector D(i−1)/j on a first input to its "OR" gate 9, and the output signal from detector Di/(j−1) on a second input. Similarly, depending on the state (conducting or blocked) of switches A and B of detectors Di/(j+1) and D(i+1)/j, detector Di/j can deliver the output signal from its "OR" gate 9 to a first input of the "OR" gate of detector D(i+1)/j and to a second input of the "OR" gate of detector Di/(j+1).

Switches A and B are connected to different controls k1, k2, k3. A particular embodiment related to controls k1, k2, k3 will now be described as a non-limitative example.

According to this particular embodiment (see FIG. 7), the same control k1 is applied to:
- switches A and B of detectors on the first row,
- switches B of detectors D2/1 and D2/3,
- switches A of detectors D3/1 and D3/3 and all switches B of detectors on the third row,
- switch B of detector D4/1.

Similarly, the same control k2 is applied to:
- all switches A of detectors in the second row and switches B of detectors D2/2 and D2/4,
- all switches A of detectors in the fourth row and switches B of detectors D4/2 and D4/4.

Finally, the same control k3 is applied to switches A of detectors D3/2 and D3/4 and to switch B of detector D4/3.

The values taken by the controls k1, K2, k3 will now be described as a function of the different applications, namely the application in which each detector is used individually (radiography mode), the application in which detectors are used in groups of 2×2 neighboring detectors (first example of radioscopy mode), or the application in which all detectors (4×4 detectors) are used (second example of radioscopy mode).

In all cases, the control k1 blocks the switches to which it is applied. The controls k2 and k3 will now be specified for different cases.

Case 1: each detector is used individually (radioscopy mode).

Controls k2 and k3 are then set to the low level (in positive logic). All switches are then blocked. Each detector only counts the particles that it detects.

Case 2: Detectors are used in groups of 2×2 neighboring detectors (first example of radioscopy mode).

Control k2 is set to high level and control k3 is set to low level (in positive logic). Counting is then done as follows:
- detector D2/2 counts particles from detectors D1/1, D1/2, D2/1, and D2/2;
- detector D2/4 counts particles from detectors D1/3, D1/4, D2/3, and D2/4;
- detector D4/2 counts particles from detectors D3/1, D3/2, D4/1, and D4/2;
- detector D4/4 counts particles from detectors D3/3, D3/4, D4/3, and D4/4;

Case 3: all detectors are used (4×4 *detectors/second* example of radioscopy *mode*).

Controls k2 and K4 are set to the high level (case of positive logic). Detector D4/4 then counts particles detected by all detectors Di/j (i, j=1, 2, 3, 4).

More generally, a large variety of pixel groups geometries is advantageously possible according to the invention. For example, it is thus possible to group detector pixels along a single direction (row or column) In particular, groups of n rows ×1 column can be useful. These groups only require "OR" functions with two inputs, eliminate horizontal links between detector pixels, accelerate reading of the detectors matrix since only one row out of n is addressed, and displace the problem of summating columns at the periphery of the matrix or outside it, which in some cases may be acceptable considering the advantages mentioned above.

Another advantage of the device according to the invention is to enable modification of the position of groups of detector pixels from one image to another. The position of groups of detector pixels can be moved from one image to the other, without increasing the number of inputs to "OR" circuits and consequently without increasing the number of switches, simply by modifying the number of controls for these switches. As a non-limitative example, for groups of 4×4 pixels, image sequences can be made as follows:

image No. 1: reference position of each group (this is the initial position for each group);
image No. 2: offset the position of a group by +2 rows horizontally without vertical offset;
image No. 3: offset the position of a group by +2 rows horizontally and +2 columns vertically;
image No. 4: offset the position of a group by +2 columns vertically, without any horizontal offset;
image No. 5: return to the group reference position; etc.

This type of modification can very significantly improve the quality of the image formed (strong reduction in moiré effects and significant increase in the spatial resolution of the image).

We will now describe other advantages of the invention.

It is usually accepted that in detector matrices for which each detector pixel is used individually, an isolated detector pixel can be defective, in a manner known in itself. The missing information from the defective detector pixel can then be replaced by the average value of signals detected by detector pixels neighboring to the defective pixel. This average value is calculated by an image processing system. On the other hand, when detector pixels are grouped together, it is not acceptable for a single defective pixel to cause loss of all information contained in an entire group of detector pixels. The counting device according to the invention overcomes this disadvantage, as will become clear after reading the example described below.

Figure 9:
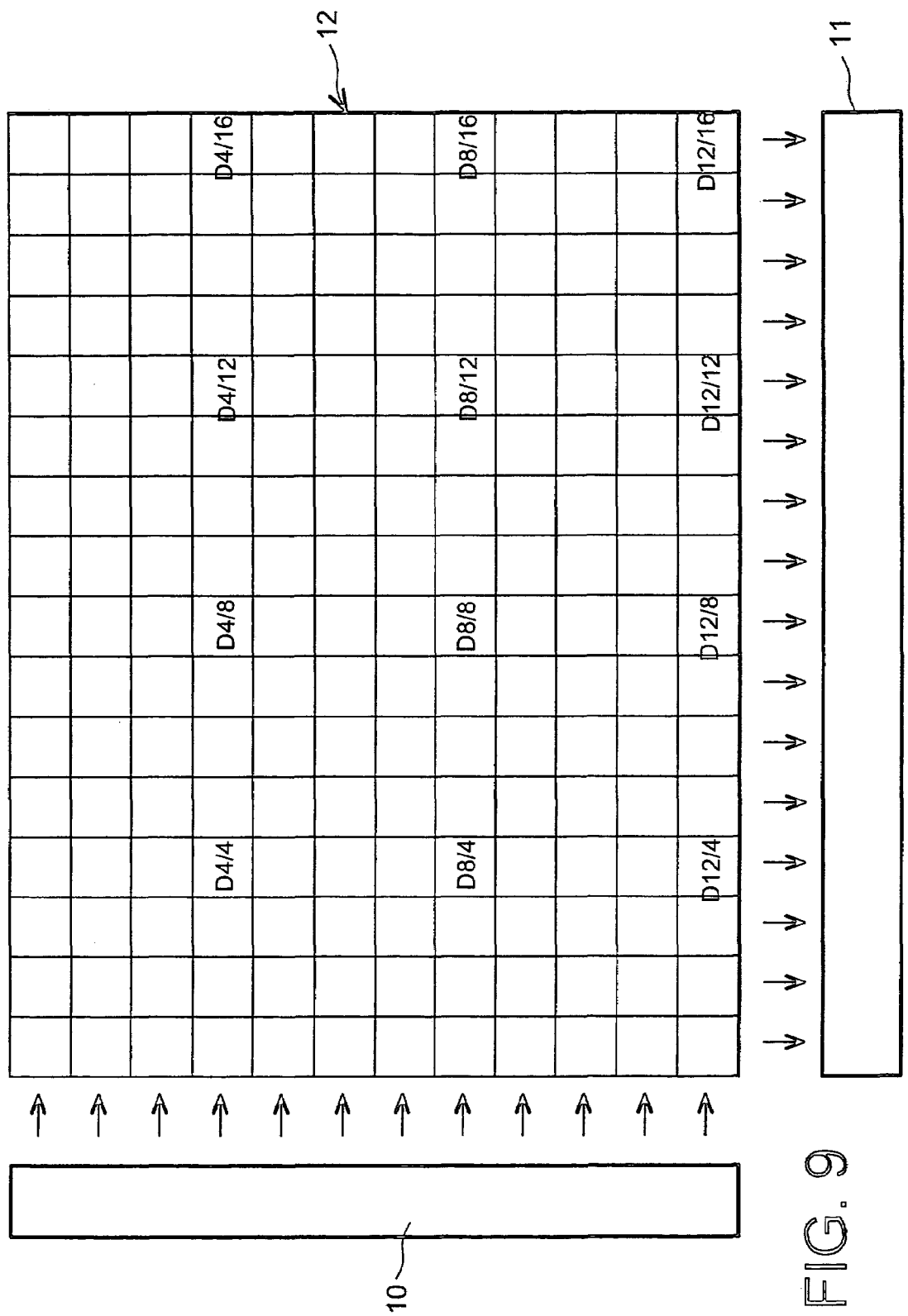
FIG. 9 symbolically shows an example of a matrix of particle detectors forming a counting device according to the invention.

Consider a counting device according to the invention in which detectors are grouped in blocks of 4×4 detectors. An example of such a counting device is shown symbolically in FIG. 9.

The counting device comprises an addressing offset register 10, a column multiplexer 11 and a detectors matrix 12. For a configuration in which the detectors are grouped in blocks of 4×4 detectors, the detectors that might be read are:

detectors D4/4, D4/8, D4/12, and D4/16 for rows of rank 1, 2, 3 and 4;
detectors D8/4, D8/8, D8/12 and D8/16 for rows of rank 5, 6, 7 and 8, and
detectors D12/4, D12/8, D12/12 and D12/16 for rows of rank 9, 10, 11 and 12.

For example, detector D8/8 is read by addressing the eighth line and selecting the eighth column. Suppose that detector D8/8 is defective (for example this information could be obtained when reading detectors individually). Instead of reading detectors D8/4, D8/8, D8/12 and D8/16 that output information contained in detector groups in rows of rank 5, 6, 7, 8, detectors D8/4, D8/7, D8/12 and D8/16 are read.

Therefore, detector D8/7 is read instead of detector D8/8, if it is not defective itself. Detector D8/7 contains the sum of the signals of nine detectors out of the group of sixteen. Therefore the detectors block is always represented in the image formed, despite a signal-to-noise ratio that is not as good as in nominal groups.

As already mentioned above, only the counter of the detector pixel that is read is used. For a given configuration of detector pixels, it is then possible to input only to detector pixel counters that will be read. This advantageously reduces consumption of the counting device. However, if it is required to keep the possibility of reading blocks in the presence of defective pixels as described above, it is necessary to maintain the power supply to counters of all detector pixels in the rows that will be read.

The invention claimed is:

1. Particle detector comprising means (1, 2, 3) of delivering electrical pulses starting from detected particles, one electrical pulse being delivered for one detected particle, and means (4) of counting the delivered electrical pulses, characterized in that it comprises means capable of receiving and transmitting electrical pulses originating from at least one second particle detector to the counting means (4), and means capable of transmitting the electrical pulses that it delivers and the electrical pulses that it receives from the said second particle detector to counting means of a third particle detector.

2. Particle detector according to claim 1, in which the means capable of receiving and transmitting electrical pulses originating from at least one second particle detector to the counting means (4) and the means capable of transmitting electrical pulses that it delivers and electrical pulses that it receives from the said second particle detector to a third particle detector include an "OR" gate with a first input to which electrical pulses delivered by the particle detector are applied, at least one additional input to which electrical pulses delivered by the second particle detector are applied, and an output connected firstly to an input of the counting means (4) and secondly to an input of an "OR" gate of the counting means of the third particle detector.

3. Particle detector according to claim 2, in which a monostable device is placed between the output from the means (1, 2, 3) of delivering electrical pulses starting from the detected particles and the first input.

4. Particle detector according to either claim 2 or 3, characterized in that the means capable of receiving and transmitting electrical pulses originating from at least one second particle detector to the counting means (4) and the means capable of transmitting electrical pulses that it delivers and electrical pulses that it receives from the said second particle detector to the counting means of a third particle detector include a switch (A, B) installed in series on the additional input.

5. Particle detector according to claim 1, characterized in that it comprises means (C) capable of inhibiting operation of the counting means (4).

6. Particle counting device, characterized in that it comprises several particle detectors according to claim 1.

7. Counting device according to claim 6, characterized in that the particle detectors are arranged in the form of a matrix of detectors.

8. Counting device according to claim 7, characterized in that it includes means of arranging particle detectors in the form of N blocks of n×m neighboring particle detectors, where N, n, and m are integer numbers equal to or greater than 1, such that at least one block of particle detectors includes a particle detector that counts particles detected by all or some of the particle detectors in the block.

9. Counting device according to claim 8, characterized in that it includes means of modifying the number of particle detectors that participate in at least one block of particle detectors.

10. Counting device according to any one of claims 7 to 9, characterized in that a particle detector Di/j located at the intersection of a row of rank i and a column of rank j, comprises an "OR" gate with three inputs, a first additional input being connected to a first switch (A) and a second additional input being connected to a second switch (B), the first switch (A) in the particle detector Di/j being connected to the output from the "OR" gate of particle detector D(i−1)/j and the second switch (B) being connected to the output from the "OR" gate of particle detector Di/(j−1), the output from the "OR" gate of detector Di/j being connected to the first switch (A) of the particle detector D(i+1)/j and to the second switch (B) of the particle detector Di/(j+1).

11. Process for reading particle detectors, characterized in that it comprises a step during which at least one first particle detector receives and counts pulses delivered by at least one second particle detector and a step during which the pulses delivered by the first particle detector and the pulses delivered to the first particle detector by the second particle detector are transmitted to counting means in a third particle detector.

12. Process for counting particles detected by a matrix of particle detectors, characterized in that it comprises a control step to arrange particle detectors in the matrix in the form of N blocks of n×m neighboring particle detectors, where N, n and m are integers greater than or equal to 1, the particle detectors in at least one block being read by means of a process for reading a detector according to claim 11 such that a particle detector in the said at least one block counts particles detected by all or some of the n×m particle detectors in the said block.

13. Process according to claim 12, characterized in that it comprises inhibition of the counting means of particle detectors in the block, other than the particle detector in the block that counts particles detected by all or some of the m×n particle detectors.

* * * * *